Patented May 16, 1944

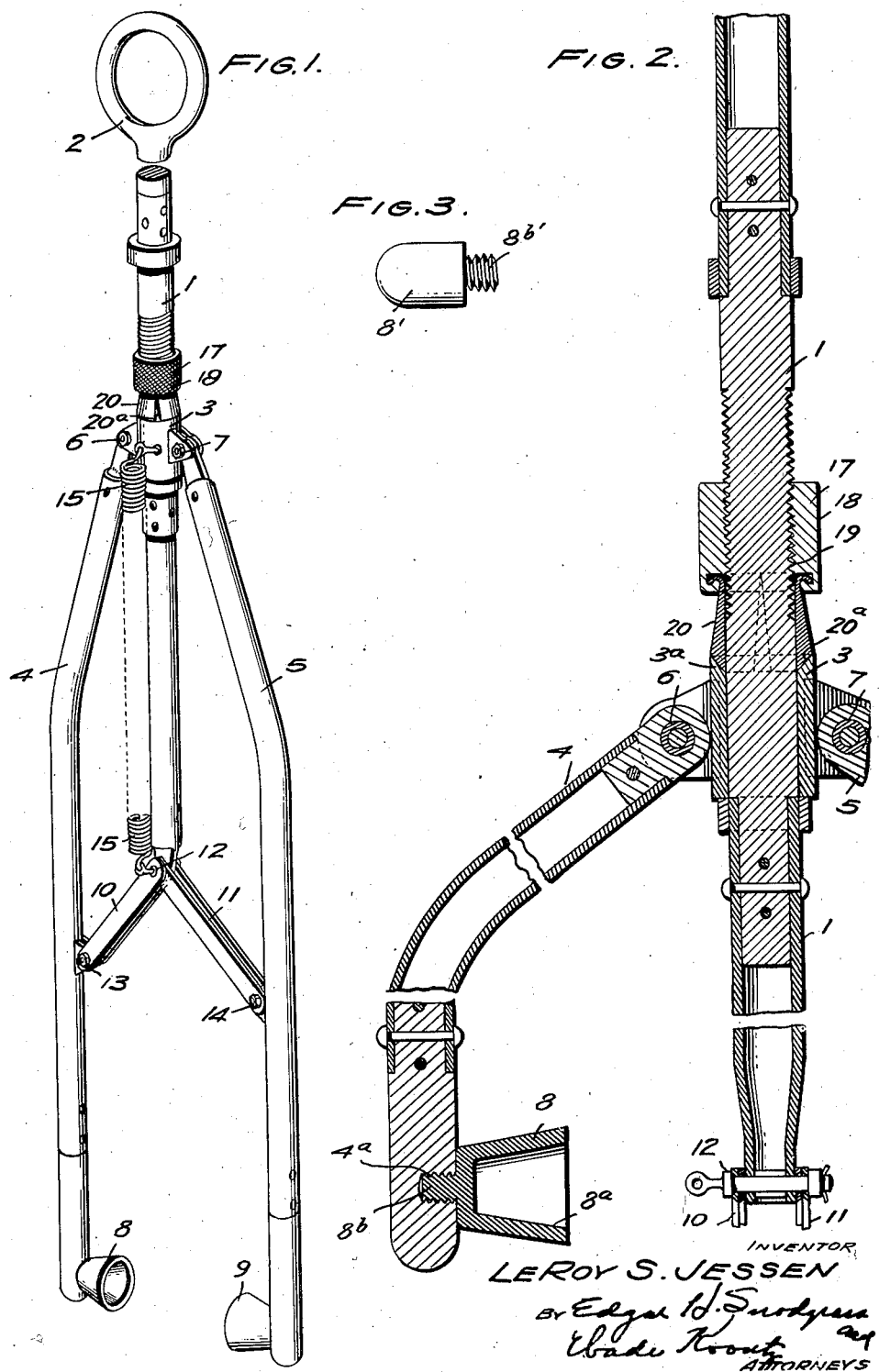

2,348,741

UNITED STATES PATENT OFFICE 2,348,741

DEVICE FOR MOVING AIRCRAFT

Le Roy S. Jessen, March Field, Calif.

Application February 12, 1943, Serial No. 475,681

9 Claims. (Cl. 280—33.14)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for facilitating the handling of airplanes and other aircraft when it is desired to move the same from one location to another on the ground without utilizing the internal motive power of such aircraft. Such a means as contemplated by the present invention is, for example, desirable when it becomes necessary to move the aircraft in and out of hangars or to and from fueling pits or the like in connection with the requirements of maintenance, repair, or storage of the aircraft.

One of the principal objects of the invention is the provision of a towing device which is simple in construction, efficient in operation and readily manipulatable by a single operator.

Another object of the invention contemplates the provision of a device of the character indicated which is readily engageable with, and disengageable from, the opposite ends of the axle of the steerable wheel of an airplane or like aircraft and includes draft means whereby the operator may tow the airplane at some little distance therefrom so as to avail of the length of the towing device for leverage to manipulate the steerable wheel with which the device is engaged whereby to conveniently accomplish steering of the aircraft in the desired direction while moving the same.

For the purpose of accomplishing the foregoing objects the embodiment of my invention herein disclosed comprises a draft bar upon which is mounted a movable member having arms hinged thereto which are provided with means for engaging the opposite ends of the axle of the steerable wheel of an airplane. Links pivoted to the draft bar have their opposite ends pivoted respectively to the said arms whereby movement of the head member relative to the draft bar will cause corresponding movement of the arms toward and away from one another depending upon the direction of the movement of the head member relative to the draft member. Resilient means is provided interconnecting the draft member and the head member whereby the latter is urged in a direction relative to the draft member tending to cause movement of the arms toward one another. Means is provided on the draft member which is adjustable to different fixed positions relative thereto for engagement with the head member to adjust the position to which the head member may be moved relative to the draft member against the action of the said resilient means, and the function of said adjustable or stop means is to limit the outward movement of said arms and thus prevent the same from becoming disengaged from the axle of an aircraft wheel with which the device may be connected.

Other objects, advantages, and features of novelty will appear as the detailed description of the invention proceeds in conjunction with the accompanying drawing in which:

Figure 1 is a perspective view of a device embodying my invention;

Figure 2 is a sectional view showing more in detail the connection of the movable head to the draft member and the manner of cooperation of the stop means with the draft member and with said head;

Figure 3 is a view showing an alternative form of axle engaging member which may be provided on the hinged arms.

Now referring to the drawing and describing the invention more in detail, the construction herein disclosed comprises a draft member 1 having at one end a ring 2 or like means for convenient manual engagement. Loosely mounted upon the draft member 1 for movement longitudinally thereof is a head member comprising a collar or slide block 3 and said collar 3 has arms 4 and 5 pivotally connected to said collar as at 6 and 7 respectively, said arms being provided with members such as 8 and 9 adapted respectively to engage opposite ends of the axle of a steerable wheel of an aircraft.

The inner end of the draft bar 1 has a plurality of links 10 and 11 pivoted thereto as at 12 and the opposite ends of said links are respectively pivoted to arms 4 and 5 as at 13 and 14. Resilient means is provided interconnecting the head member 3 with the draft member 1 and functioning to urge the head member 3 to move relatively to the draft member 1 in a manner such that the arms 4 and 5 are drawn toward one another by the action of said resilient means. As shown, the latter means may comprise a suitable spring 15 having its ends connected respectively to the draft member 1 and the head member 3 under tension for the purpose mentioned.

For the purpose of limiting the movement of the head member 3 relative to the draft member 1 in the direction of the ring end 2 there is provided on the draft member 1 adjustable stop means generally designated by the numeral 17. According to the embodiment of the invention illustrated herein said adjustable stop means may comprise a knurled nut 18 cooperating with the threaded portion 19 of the draft member 1, said nut 18 having integrally associated therewith the slit conical sleeve 20 whose conical or tapered end 20a is adapted to seat within a correspondingly tapered seat 3a provided at the upper edge of the collar member 3.

The members 8 and 9 provided on the arms 4 and 5 for engagement with the opposite ends of an aircraft wheel axle may be cored out to provide a cupped or hollow portion 8a for receiving the axle end therein. For use with tubular hollow type axles, the pin members 8' may be substituted for the cup members 8 and 9. Either of the alternative members 8 or 8' may be interchangeably connected with the arms 4 and 5 by the screw stud connection provided at 8b or 8b' for cooperation with threaded bores such as 4a provided at the ends of the arms 4 and 5.

In the use of the invention the operator may grasp the ring portion 2 with one hand and with the other hand he may grasp one of the arms 4 or 5 and pull the same outwardly, which causes the head member or collar 3 to slide along the draft bar 1 toward the ring end of the latter. Under such condition the links 10 and 11 will tend to straighten out, spreading the arms 4 and 5 away from one another so that the axle engaging members 8 and 9 provided at the ends of the arms 4 and 5 are farther apart than the ends of the wheel axle to be engaged thereby, enabling the ends of said axle to be associated with said members 8 and 9 under the action of the spring 15 which tends to draw the arms 4 and 5 toward one another upon release of the outward pressure initially exerted by the operator upon one of the arms 4 or 5 as above mentioned.

When the members 8 and 9 are so engaged with the ends of the wheel axle as just described, the stop means 17, comprising the split-cone jam-nut structure 18, 20, is caused to be moved relative to the draft bar 1 into tight engagement with the collar or head member 3 by screwing down the nut 18 so as to cause the tapered end 20a of the split cone or sleeve 20 to become firmly seated in the correspondingly tapered seat 3a provided at the outer edge of the head member collar 3. Upon tightening the stop means 17 into limiting engagement with the head or collar 3 as just described, the members 8 and 9, having been engaged with the aircraft steerable wheel axle ends as above mentioned, the arms 4 and 5 are prevented from being spread apart and thus the device is maintained in a condition of firm connection with the aircraft steerable wheel.

It will be readily apparent that under such condition the aircraft may now be readily moved about from place to place by pulling on the ring 2 end of the draft member 1 and that the leverage created by the length of the towing device of the invention will readily enable the aircraft steerable wheel to be turned about the axis of its connection with the aircraft so as to facilitate steering of the same while the aircraft is being moved by the use of the device of the invention in the manner described.

It will be apparent also that the invention discloses a very simple construction of towing device for the purposes intended, having the advantages of universal application to aircraft steerable wheel axles of different sizes and types and also in respect to the manner in which the device may be very quickly connected with, or disconnected from the aircraft steerable wheel axle, and in respect to the provisions for firm or positive connection of the device therewith when the device of the invention is cooperatively associated with such axle.

What I claim as new and desire to secure by Letters Patent of the United States, is:

1. In a device for moving aircraft, in combination, a draft bar, a head member mounted thereon and movable relative thereto longitudinally thereof, a pair of arms pivoted to said member, a plurality of links pivotally connected to one end of said bar, each of said links being pivoted respectively to one of said arms, resilient means inter-connecting said member and said draft bar and normally acting thereupon in a manner tending to draw the said arms toward one another, and a wheel axle receiving element on each of said arms, said elements being arranged to receive the opposite ends of a wheel axle.

2. In a device for moving aircraft, in combination, a draft bar, a collar mounted thereon and movable relative thereto longitudinally thereof, a pair of arms pivoted to said collar, one end of said bar extending through said collar intermediate said arms, a plurality of links pivotally connnected to said one end of said bar, each of said links being pivoted respectively to one of said arms, a spring connected in tension to said collar and to the bar at a point thereon intermediate said arms, said spring normally acting to draw said arms toward one another and a wheel axle receiving element on each of said arms, said elements being arranged to receive the opposite ends of a wheel axle.

3. A device as claimed in claim 1, combined with means associated with said bar and adjustable to different fixed positions relative thereto for maintaining the head member in a desired position relative to said bar against the action of said resilient means.

4. In a device for moving aircraft, in combination, a draft bar, a head member mounted thereon and movable relative thereto longitudinally thereof, a pair of arms pivoted to said member, a plurality of links pivotally connected to one end of said bar, each of said links being pivoted respectively to one of said arms, resilient means inter-connecting said member and said draft bar and normally acting thereupon in a manner tending to draw the said arms toward one another, and means on each of said arms for engaging respectively the opposite ends of a wheel axle, stop means associated with said bar and adjustable to different fixed positions relative thereto for maintaining the head member in a desired position relative to said bar against the action of said resilient means, said stop means comprising a member threadingly associated with said draft bar, and a sleeve member integrally associated with said last member for movement therewith relative to the draft bar, said head member being provided with a tapered seat and said sleeve member having a tapered portion adapted for seating engagement therewith.

5. In a device for moving aircraft, in combination, a draft bar, a head member mounted thereon and movable relative thereto longitudinally thereof, a pair of arms pivoted to said member, a plurality of links pivotally connected to one end of said bar, each of said links being pivoted respectively to one of said arms, resilient means inter-connecting said member and said draft bar and normally acting thereupon in a manner tending to draw the said arms toward one another, and a wheel axle receiving element on each of said arms, said elements being arranged to receive the opposite ends of a wheel axle, the element on each arm having detachable connection therewith and having a cupped portion for receiving an axle end.

6. In a device for moving aircraft, in combination, a draft bar, a head member mounted thereon and movable relative thereto longitudinally thereof, a pair of arms pivoted to said member, a plurality of links pivotally connected to one end of said bar, each of said links being pivoted respectively to one of said arms, resilient means inter-connecting said member and said draft bar and normally acting thereupon in a manner tending to draw the said arms toward one another, and a wheel axle receiving element on each of said arms, said elements being arranged to receive the opposite ends of a wheel axle, the element on each arm having a detachable threaded association therewith and comprising a bearing portion engageable within a hollow axle end.

7. In a device for moving aircraft, in combination, a draft bar, a head member pivoted thereon and movable relative thereto longitudinally thereof, a pair of arms pivoted to said member, a plurality of links pivotally connected to one end of said bar, each of said links being pivoted respectively to one of said arms, resilient means connecting said member and said draft bar and normally acting thereupon in a manner tending to draw the said arms toward one another, a wheel axle receiving element on each of said arms, said elements being arranged to receive the opposite ends of a wheel axle, and stop means associated with said bar and adjustable to different fixed positions relative thereto for maintaining the head member in a desired position relative to said bar against the action of said resilient means, said stop means comprising a member threadingly associated with said draft bar.

8. In a device for moving aircraft, in combination, a draft bar, a head member pivoted thereon and movable relative thereto longitudinally thereof, a pair of arms pivoted to said member, a plurality of links pivotally connected to one end of said bar, each of said links being pivoted respectively to one of said arms, resilient means connecting said member and said draft bar and normally acting thereupon in a manner tending to draw the said arms toward one another, a wheel axle receiving element on each of said arms having detachable connection therewith and having a cupped portion for receiving an axle end, and stop means associated with said bar and adjustable to different fixed positions relative thereto for maintaining the head member in a desired position relative to said bar against the action of said resilient means, said stop means comprising a member threadingly associated with said draft bar.

9. In a device for moving aircraft, in combination, a draft bar, a head member pivoted thereon and movable relative thereto longitudinally thereof, a pair of arms pivoted to said member, a plurality of links pivotally connected to one end of said bar, each of said links being pivoted respectively to one of said arms, resilient means connecting said member and said draft bar and normally acting thereupon in a manner tending to draw the said arms toward one another, a wheel axle receiving element on each of said arms having detachable threaded association therewith and comprising a bearing portion engageable within a hollow axle end, and stop means associated with said draft bar and adjustable to different fixed positions relative thereto for maintaining the head member in a desired position relative to said bar against the action of said resilient means, said stop means comprising a member threadingly associated with said draft bar.

LE ROY S. JESSEN.